US009880582B2

(12) United States Patent
Herrmann

(10) Patent No.: US 9,880,582 B2
(45) Date of Patent: Jan. 30, 2018

(54) EDUCATIONAL APPARATUS FOR LEARNING MATH AS WELL AS COMPONENTS THEREFOR AND METHODS INCLUDING THE SAME

(71) Applicant: LearnTools Inc., Westlake, OH (US)

(72) Inventor: Raymond J. Herrmann, Westlake, OH (US)

(73) Assignee: LEARNTOOLS INC., Westlake, OH (US)

( * ) Notice: Subject to any disclaimer, the term of this patent is extended or adjusted under 35 U.S.C. 154(b) by 219 days.

(21) Appl. No.: 14/678,510

(22) Filed: Apr. 3, 2015

(65) Prior Publication Data

US 2015/0293554 A1    Oct. 15, 2015

Related U.S. Application Data

(60) Provisional application No. 61/978,293, filed on Apr. 11, 2014.

(51) Int. Cl.
*G06C 1/00* (2006.01)
*G09B 19/02* (2006.01)

(52) U.S. Cl.
CPC .............. *G06C 1/00* (2013.01); *G09B 19/02* (2013.01)

(58) Field of Classification Search
CPC .................................. G06C 1/00; G09B 19/02
USPC ......................................................... 434/203
See application file for complete search history.

(56) References Cited

U.S. PATENT DOCUMENTS

| | | | | |
|---|---|---|---|---|
| 2,228,554 A * | 1/1941 | Brown | ............. | G09B 19/02 434/203 |
| 2,646,631 A * | 7/1953 | Lazar | ............. | G09B 19/02 434/203 |
| 2,654,164 A * | 10/1953 | Seidenberg | ............. | G09B 19/02 434/203 |
| 2,655,737 A * | 10/1953 | Dero | ............. | G09B 19/02 434/203 |
| 3,633,287 A * | 1/1972 | Squires | ............. | G09B 19/02 434/189 |
| 3,688,418 A * | 9/1972 | Wilson | ............. | G06C 1/00 434/203 |
| 2007/0166673 A1 * | 7/2007 | Frieman | ............. | G09B 19/02 434/203 |
| 2008/0280273 A1 * | 11/2008 | Lee | ............. | G09B 19/02 434/203 |

(Continued)

*Primary Examiner* — Eddy Saint-Vil
(74) *Attorney, Agent, or Firm* — Fay Sharpe LLP

(57) ABSTRACT

A counting element is dimensioned for sliding engagement along an outside surface of an elongated rod of an educational apparatus. The counting element includes an element body extending between first and second end surfaces. The element body includes an outer wall a plurality of inner walls disposed radially inward of the outer wall. The inner walls are operatively connected to the outer wall adjacent the first end surface and extend to a free end disposed toward the second end surface. The inner walls define a passage dimensioned to receive the elongated rod. The free ends of the inner wall portions are radially deflectable and function as biasing elements operative to generate frictional resistance to sliding movement of the counting element along the outside surface of the elongated rod. An educational apparatus includes a frame, a plurality of elongated rods and a plurality of counting elements. Methods are also included.

20 Claims, 10 Drawing Sheets

(56) References Cited

U.S. PATENT DOCUMENTS

| | | | | |
|---|---|---|---|---|
| 2012/0028229 A1* | 2/2012 | Harte | ................... | G09B 19/02 |
| | | | | 434/203 |
| 2012/0251986 A1* | 10/2012 | Silas-Martin | .......... | G09B 19/02 |
| | | | | 434/203 |
| 2013/0052617 A1* | 2/2013 | Harte | ................... | G09B 19/02 |
| | | | | 434/203 |
| 2013/0236864 A1* | 9/2013 | Harte | ................... | G09B 19/02 |
| | | | | 434/203 |

* cited by examiner

EDUCATIONAL APPARATUS FOR LEARNING MATH AS WELL AS COMPONENTS THEREFOR AND METHODS INCLUDING THE SAME

This application claims priority from U.S. Provisional Patent Application No. 61/978,293, filed on Apr. 11, 2014, which is hereby incorporated herein by reference in its entirety.

BACKGROUND

The subject matter of the present disclosure broadly relates to the art of educational devices and, more particularly, to apparatuses for learning math as well as components for such apparatuses and methods of assembling the same. Methods of teaching using such educational apparatuses and components are also included.

Abacus-type apparatuses have been used for many centuries for a variety of purposes, such as counting totals and calculating sums, for example. In some cases, such apparatuses have also been used for educational purposes. Notwithstanding the long-term usage and overall success of known abacus-type apparatuses, it is believed desirable to develop constructions suitable for use in an educational setting as well as methods of teaching that utilize such constructions and/or otherwise advance the art of educational devices for learning math.

BRIEF DESCRIPTION

One example of an apparatus in accordance with the subject matter of the present disclosure can include a frame that at least partially defines a frame opening. At least one elongated rod can extend at least partially across the frame opening and can be supported on or along the frame. A plurality of counting elements can be displaceably supported on the at least one elongated rod.

In some cases, a frame according to the above paragraph can include a base wall (or base wall portion). A first side wall (or side wall portion) can extend from the base wall and a second side wall (or side wall portion) can extend from the base wall in spaced-apart relation to the first side wall. In a preferred arrangement, the first and second side walls being co-extensive and have an approximately common length terminating at a distal end.

In some cases, a frame according to the above paragraphs can, optionally, include a handle wall extending from the base wall in a direction opposite the first and second side walls.

In some cases, the at least one elongated rod according to the above paragraphs can include a plurality of elongated rods that can be disposed in spaced relation to one another along the frame in a lengthwise direction of the first and second side walls. In a preferred arrangement, the elongated rods can be co-extensive with one another and can be oriented in approximate alignment with one another. In some cases, the plurality of elongated rods can include between three (3) and five (5) elongated rods. In a more preferred arrangement, four (4) elongated rods can be used.

In some cases, a plurality of counting elements according to the above paragraphs can include two or more counting elements displaceably supported along the at least one elongated rod. In a preferred arrangement, the plurality of counting elements can include ten (10) counting elements disposed along each of a plurality of elongated rods. Additionally, in some cases, the plurality of counting elements can include two (2) counting elements having a first color and eight (8) counting elements having a second color disposed along each of the plurality of elongated rods. In a preferred arrangement, a different second color is used for the eight counting elements along each elongated rod. In some cases, the ten counting elements along each of the plurality of elongated rods can include a sequence of four counting elements having the second color, one counting element having the first color, four counting elements having the second color and one counting element having the first color. In such case, the two counting elements having the first color can represent the fifth and tenth counting elements on a given elongated rod.

One example of a counting element in accordance with the subject matter of the present disclosure can be dimensioned for sliding engagement on or along an associated elongated rod having an outer surface. The counting element can include an element body with a longitudinal axis and a body wall (or body wall portion) that extends peripherally about the longitudinal axis. A plurality of inner walls (or inner wall portions) can be disposed radially inward from the body wall and include a distal end that is freely deflectable to engage the outer surface of the associated elongated rod. In some cases, a drag bump or other projection can extend radially inward from along the distal end of the inner walls to abuttingly engage the outer surface of the associated elongated rod.

In some cases, a counting element according to the above paragraph can have a ridge extending radially outward from along the body wall with the ridge having a width that is less than the full width of the counting element. Additionally, in some cases, one or more tactile bumps, surface discontinuities or other features can be formed on or along the outer peripheral surface of the ridge.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and ease of understanding.

Figure 1:
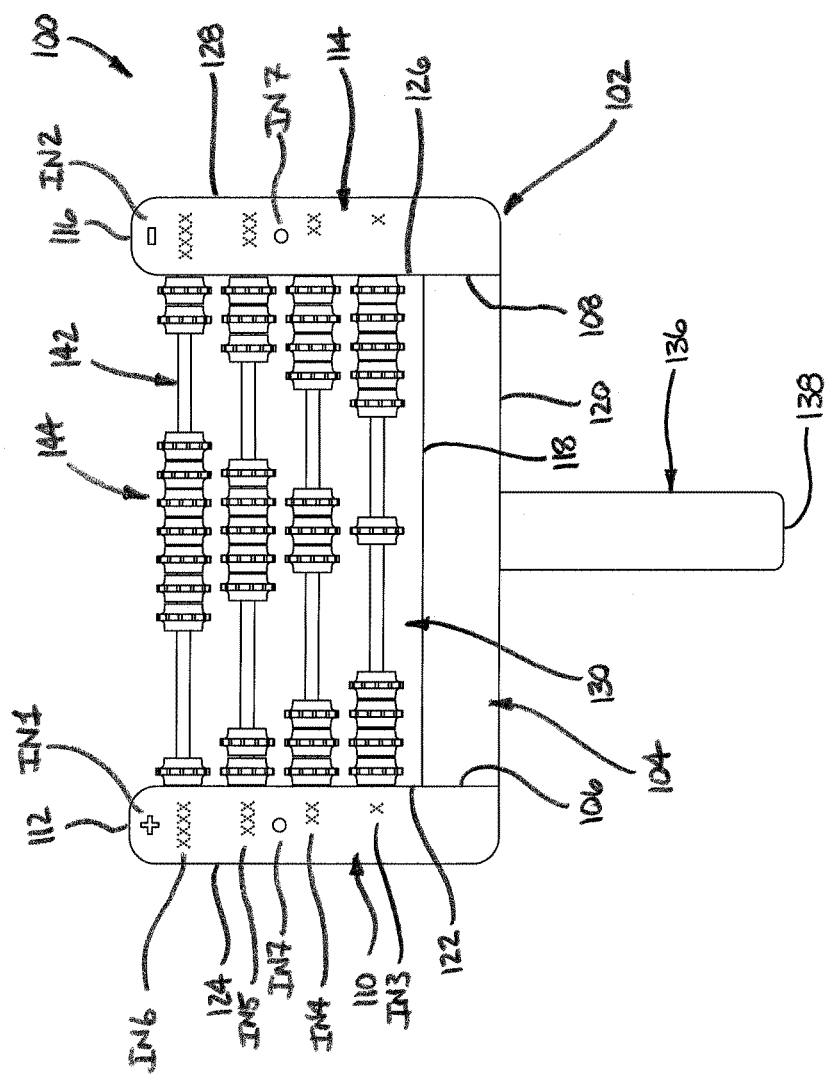
FIG. 1 is a front elevation view of one example of an apparatus for learning math in accordance with the subject matter of the present disclosure.
Figure 2:
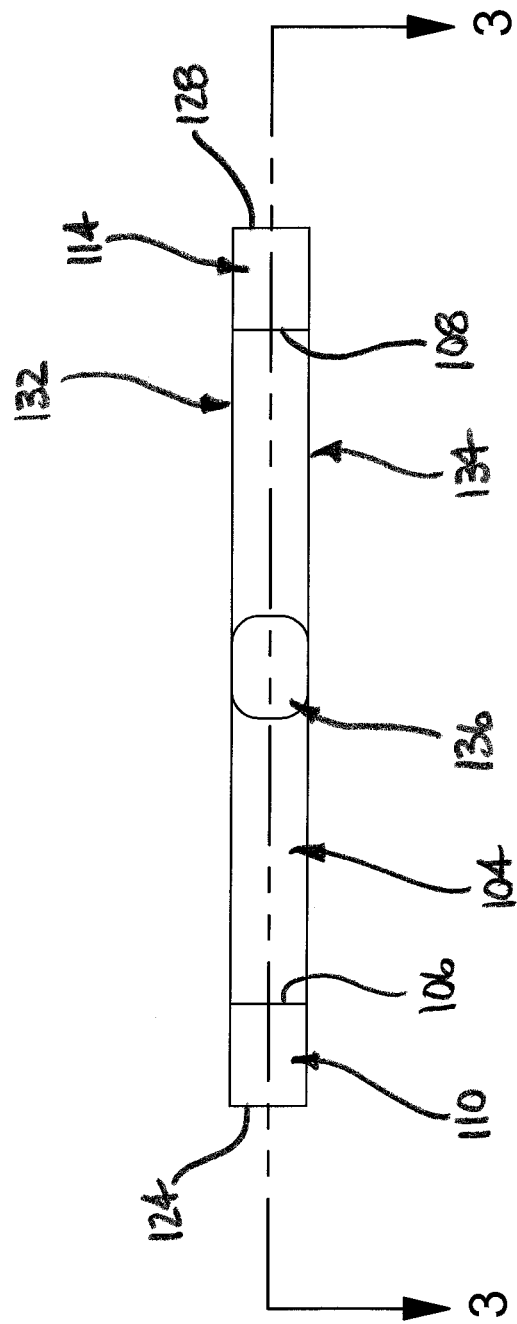
FIG. 2 is a bottom plan view of the exemplary apparatus shown in FIG. 1.
Figure 3:
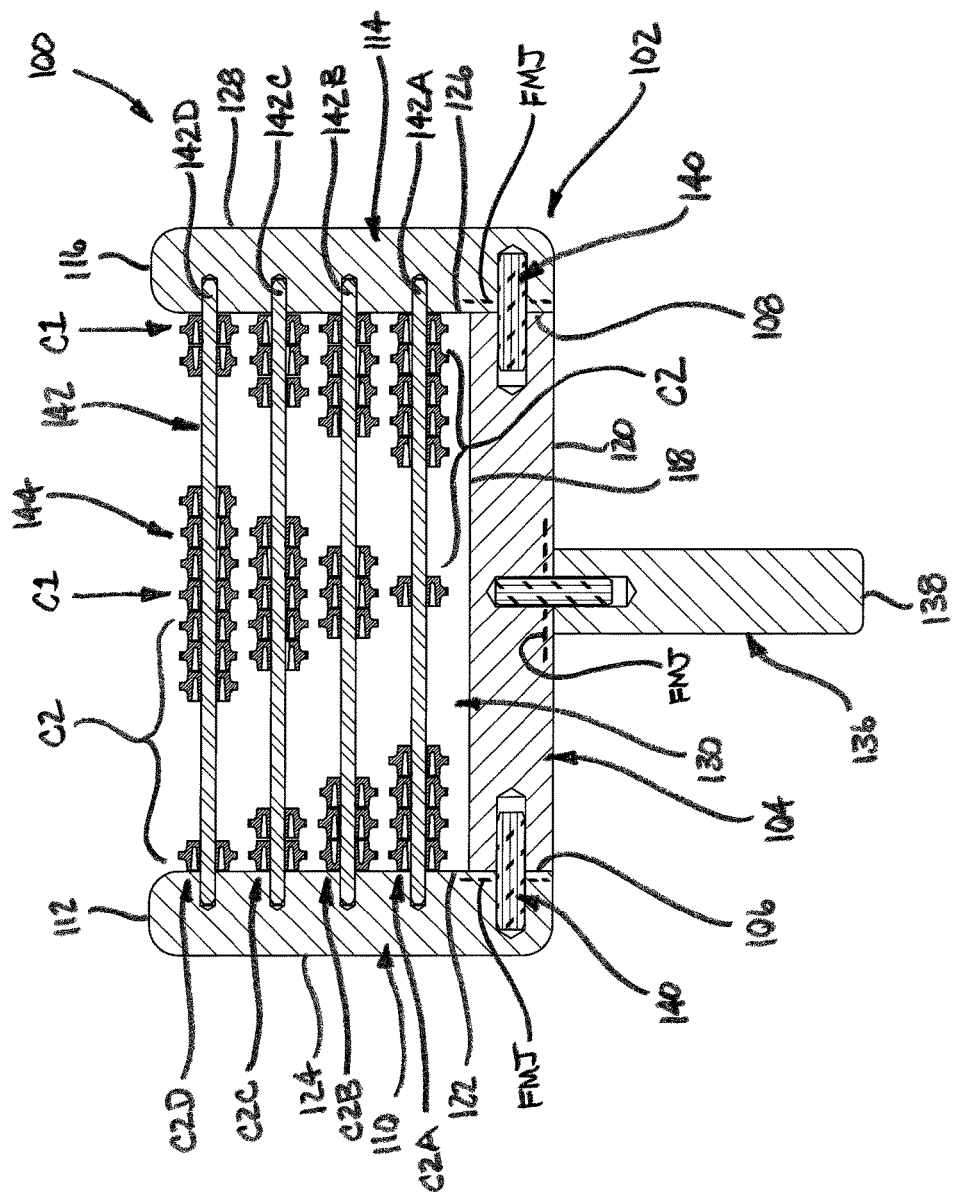
FIG. 3 is a cross-sectional view of the exemplary apparatus in FIGS. 1 and 2 taken from along line 3-3 in FIG. 2.

FIGS. 1-3 illustrate one example of an apparatus 100 in accordance with the subject matter of the present disclosure for use as an educational apparatus, which may be particularly well suited for learning math. Apparatus 100 is shown as having an abacus-style construction and includes a frame 102, which can be formed in any suitable manner and from any suitable combination of components and materials.

As one example, frame 102 is shown as including a base wall (or base wall portion) 104 that extends lengthwise between opposing end edges (or surfaces) 106 and 108. A side wall (or side wall portion) 110 is positioned adjacent edge 106 and extends from along base wall 104 toward a distal end 112. A side wall (or side wall portion) 114 is positioned adjacent edge 108 and extends from along base wall 104 toward a distal end 116. Base wall 104 includes a first or upper edge (or surface) 118 and a second or lower edge (or surface) 120. Side wall 110 includes a first or inner edge (or surface) 122 and a second or lower edge (or surface) 124. Similarly, side wall 114 includes a first or inner edge (or surface) 126 and a second or lower edge (or surface) 128.

Side wall 110 and side wall 114 are disposed in spaced-apart relation to one another and are oriented in approximately parallel alignment with one another. In a preferred arrangement, side walls 110 and 114 have an approximately common length and, as such, are coextensive with one another. Edge 118 of base wall 104 together with inner edges 122 and 126 together at least partially define a frame opening 130. Frame 102 also has a first or front face or surface 132 (FIG. 2) and a second or rear face or surface 134 (FIG. 2) opposite front surface 132. Apparatus 100 can, optionally, include a handle wall (or handle wall portion) 136 that extends from along base wall 104 toward a distal end 138 disposed in spaced relation to base wall 104.

In cases in which frame 102 is formed from two or more components and/or elements, it will be appreciated that any suitable type, kind and/or manner of attachment can be used to secure any such components and/or elements to one another. As one example, side walls 110 and 114 can be respectively secured to base wall 104 along edges 106 and 108 by way of one or more securement devices 140 (e.g., fluted dowels, pins and/or threaded fasteners) and/or one or more flowed-material joints (e.g., adhesive joints), such as are represented by dashed lines FMJ in FIG. 3, for example.

An apparatus in accordance with the subject matter of the present disclosure can also include at least one elongated rod. Apparatus 100 is shown in FIGS. 1-4 as including a plurality of elongated rods 142 extending across frame opening 130 in frame 102. It will be appreciated that any suitable number of elongated rods can be used. In a preferred arrangement, plurality of elongated rods 142 can include between three (3) and five (5) elongated rods. In a more preferred arrangement, four (4) elongated rods can be used.

The elongated rods are disposed in spaced-apart relation to one another and are oriented in approximately parallel alignment with one another. In a preferred arrangement, elongated rods 142 have an approximately common length and, as such, are coextensive with one another. Additionally, in a preferred arrangement, elongated rods 142 can have an elongated axis (not shown) extending therealong and an outer surface with an approximately circular cross-sectional shape. Furthermore, it will be appreciated that the elongated rods can be formed from any suitable material or combination of materials, such as a metal material, a polymeric material and/or a wood material, for example.

The elongated rods extend between side walls 110 and 114 and can be secured thereon in any suitable manner. As one example, a plurality of recesses or holes (not numbered) can extend into the side walls, such as from along edges 122 and 126 thereof. In a preferred arrangement, holes on or along each of edges 122 and 126 can be disposed in approximate coaxial alignment with one another. In such case, at least a portion of elongated rods 142 can be received within the holes and thereby retained within frame opening 130 by side walls 110 and 114. For convenience, the elongated rods are individually identified in FIG. 3 with elongated rod 142A disposed toward base wall 104, elongated rod 142D disposed toward distal ends 112 and 116, and elongated rods 142B and 142C disposed therebetween.

Apparatus 100 also includes a plurality of counting elements or beads 144 disposed along elongated rods 142. In a preferred arrangement, a common number of counting elements are included on each of elongated rods 142A-D, such as a number from five (5) to ten (10) beads for example. In a preferred arrangement, ten (10) beads are included on or along each of the elongated rods with two of the ten beads on each elongated rod having a first color, which is represented by columns C1 in FIG. 3. As shown in FIG. 1, the ten beads per row are parsed into pairs of five (5) by columns C1, which can facilitate count-recognition especially in relation to the current decimal system. Parsing the beads into pairs of five is achieved by means of a unique first color for the fifth and tenth beads, which are common to all rows, while the remaining beads in each row are the same color with each row having a different color for the remaining beads.

That is, the remaining eight beads on each elongated rod can have a second color, which is represented by columns C2 in FIG. 3 with the second color being different than the first color. Additionally, in a preferred arrangement, beads having a different second color can be used along each of the different rods, such as is represented by reference characters C2A, C2B, C2C and C2D in FIG. 3, for example. Such color differentiation can encourage interpretation that each row is unique in some way. And, in some constructions, colors such as red and green can be separated by another color to accommodate color blind users.

In some cases, apparatus 100 can include one or more indicia disposed on or along either one or both of first surface 132 and second surface 134. Additionally, it will be appreciated that any such indicia can include text, symbols, geometric shape, images and/or graphics of any suitable size, configuration and/or arrangement. For example, apparatus 100 is shown in FIG. 1 as including indicia IN1 and IN2 respectively disposed along side walls 110 and 114, such as along respective distal ends 112 and 116 thereof. In the arrangement shown, indicia IN1 takes the form of a plus (+) sign and indicia IN2 takes the form of a minus (−) sign, which respectively denote the "additive" direction of counting element motion and the "subtractive" direction of counting element motion.

As another example, each of the rows of apparatus 100, which are formed by counting elements disposed along each of the plurality of elongated rods, can represent consecutive powers of ten (10), in accordance with the current decimal system. In such case, indicia IN3, IN4, IN5 and/or IN6 can be disposed along either or both of side walls 110 and 114 adjacent a corresponding one of elongated rods 142A-D. As shown in FIG. 1, for example, in such case, indicia IN3 can take the form of the number one (1), indicia IN4 can take the form of the number ten (10), indicia IN5 can take the form of the number one hundred (100) and indicia IN6 can take the form of the number one thousand (1000).

As a further example, apparatus 100 is shown in FIG. 1 as including indicia IN7 disposed along side walls 110 and 114. In the arrangement shown, indicia IN7 is positioned between indicia IN4 and IN5 and can take the form of a decimal point or dot that can act as a separator, such as may be useful for allowing money count lessons to be parsed between Dollars (above) and Cents (below), for example. In other cases, such a dot separator can be used for activities that include parsing the rows, such as for keeping score of two items (e.g., game players) at counts up to one hundred ten (110).

Figure 4:
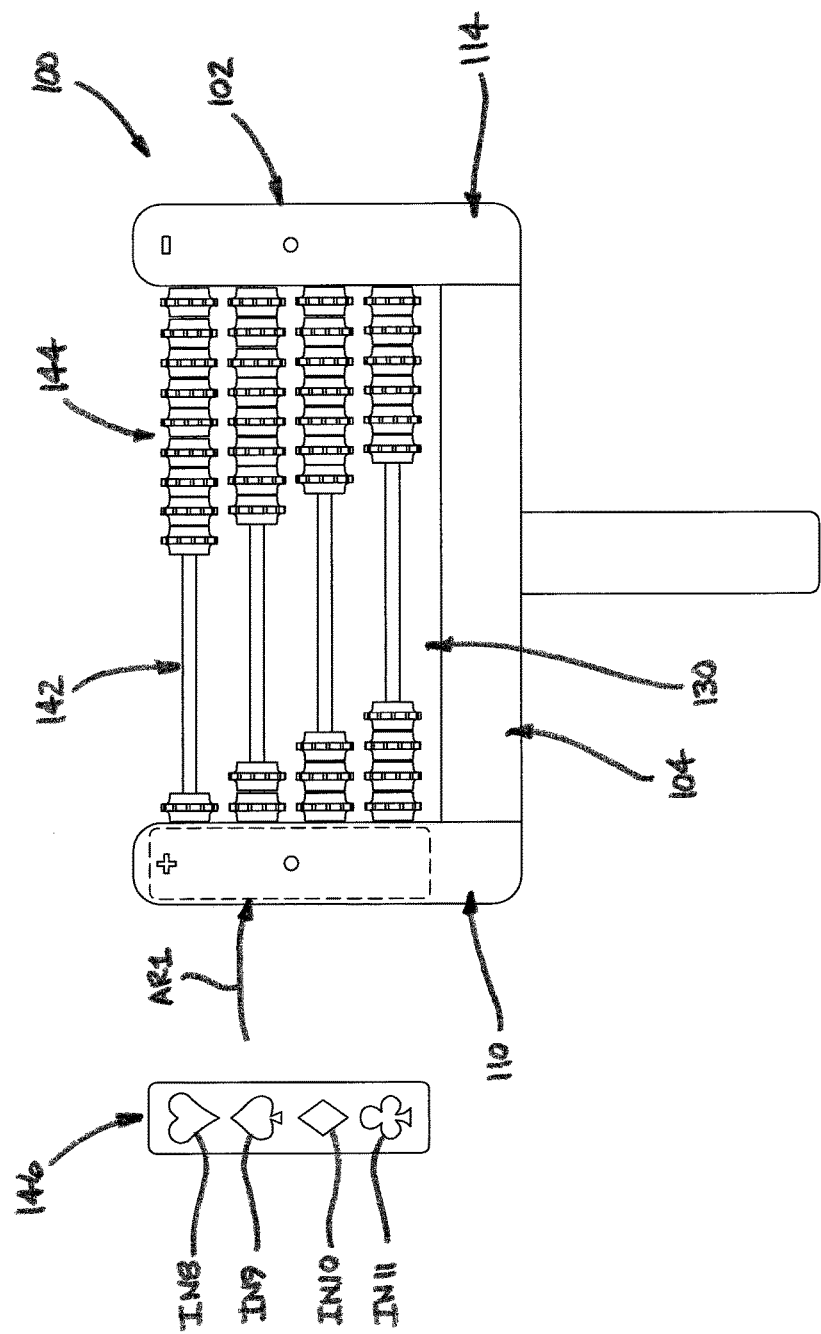
FIG. 4 is a front elevation view of the exemplary apparatus in FIGS. 1-3 shown prior to assembly with external indicia.
Figure 5:
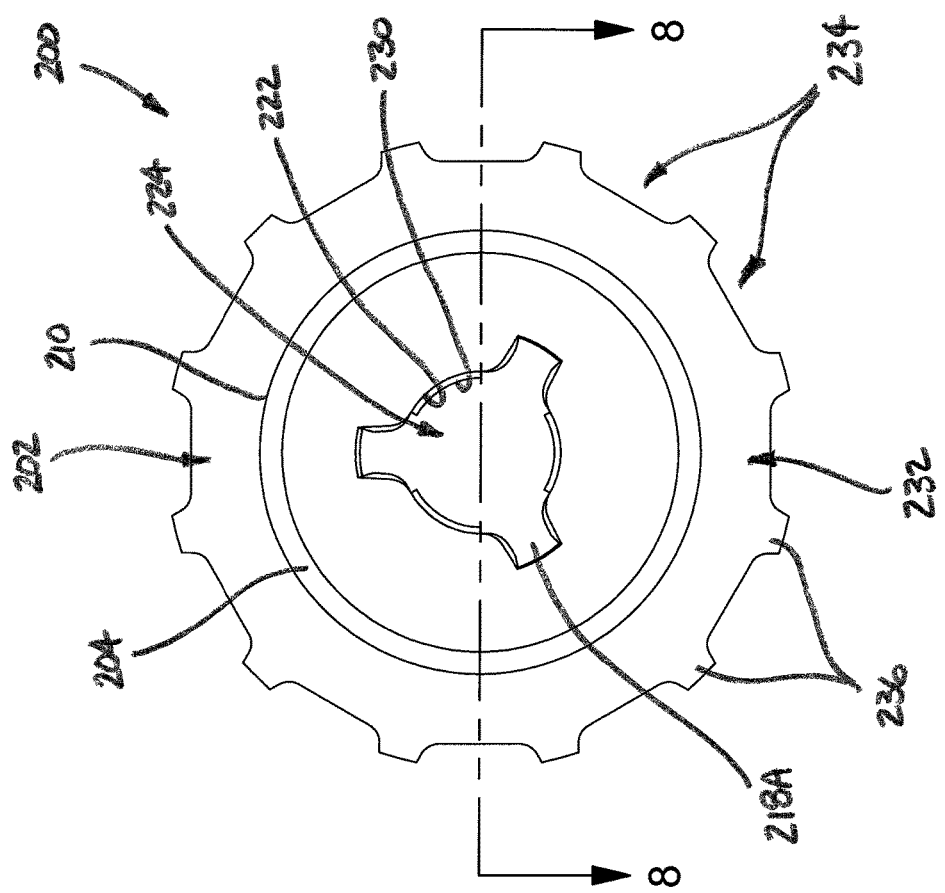
FIG. 5 is a front elevation view of one example of a counting element in accordance with the subject matter of the present disclosure.
Figure 6:
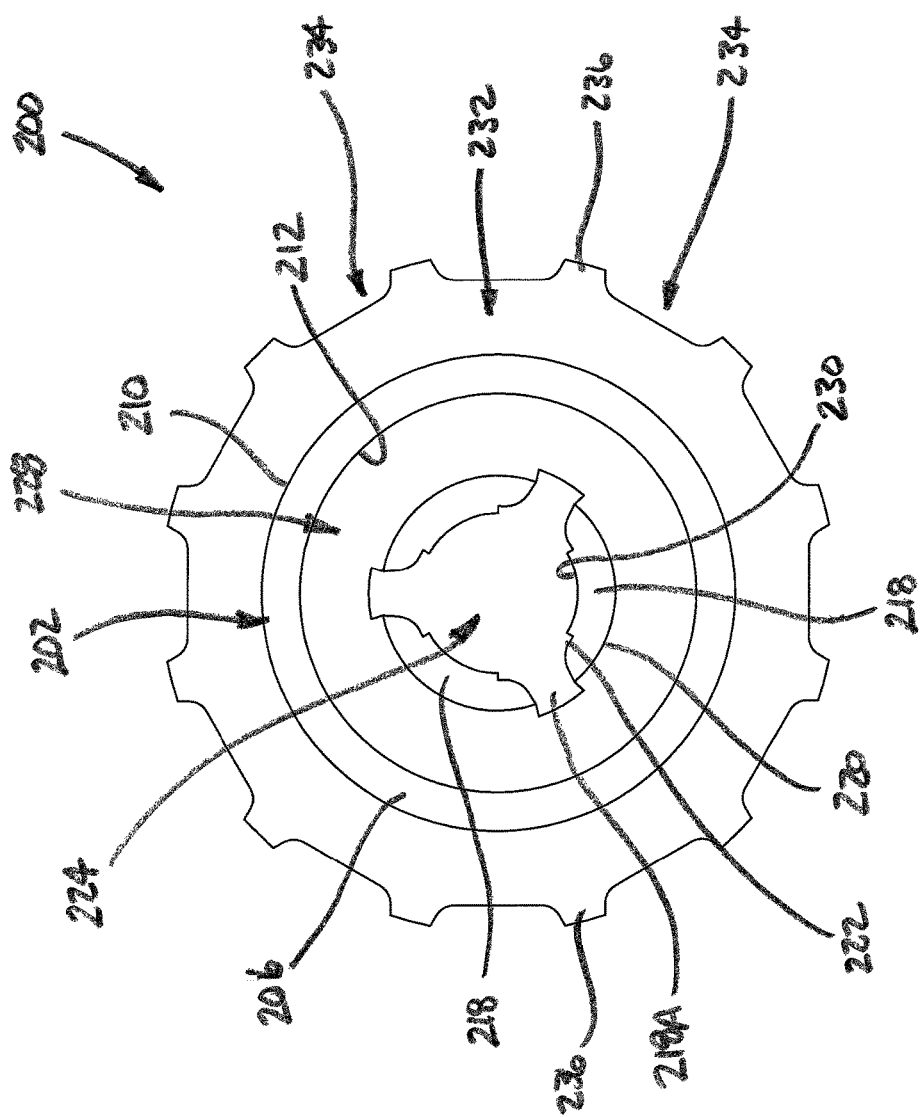
FIG. 6 is a rear elevation view of the exemplary counting element in FIG. 5.
Figure 7:
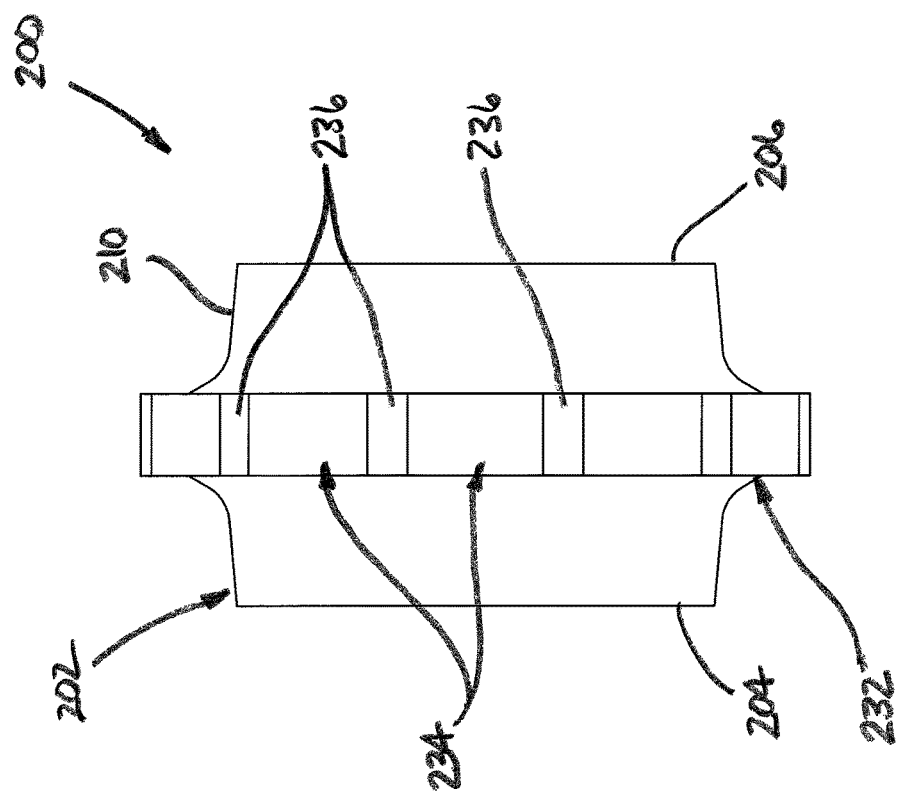
FIG. 7 is a side elevation view of the exemplary counting element in FIGS. 5 and 6.
Figure 8:
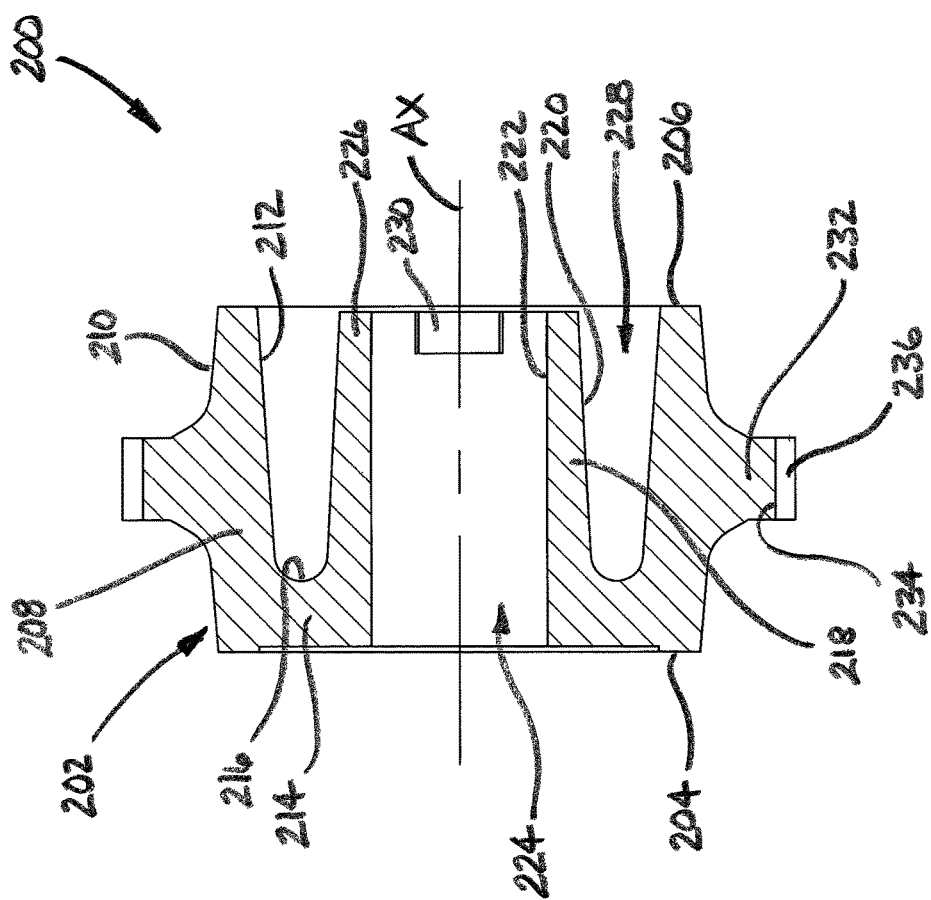
FIG. 8 is a cross-sectional view of the exemplary counting element in FIGS. 5-7 taken from along line 8-8 in FIG. 7.

As still another example, apparatus 100 is shown in FIG. 4 as being capable of use with an external or otherwise separately provided legend 146 that can be secured on or along one or more of side walls 110 and/or 114, such as in approximate alignment with one or more rows of apparatus 100. It will be appreciated that legend 146 can be attachably and detachably secured on or along frame 102 of apparatus 100 in any suitable manner, such as by way of a removable adhesive joint (not shown), for example, which is represented in FIG. 4 by arrow AR1.

Additionally, it will be appreciated that legend 146 can include any text, symbols, geometric shape, images and/or graphics of any suitable size, configuration and/or arrangement, such as may be used for additional activities and/or lessons that can be provided separately. In the arrangement shown in FIG. 4, for example, legend 146 includes indicia IN8, IN9, IN10 and IN11 with indicia IN8 taking the form of a heart-shaped symbol, indicia IN9 taking the form of a spade-shaped symbol, indicia IN10 taking the form of a diamond-shaped symbol and indicia IN11 taking the form of a club or clover-shaped symbol. The indicia can be of a common color or, alternately, can include any combination of two or more colors. In some cases, such an attachable/detachable legend can be used to allow each bead row to be assigned to an independent counting problem. In the case of an apparatus including four bead rows, for example, by allowing four "problems" to be solved in a side-by-side fashion and/or to allow four lessons or iterations of the same lesson to be completed to aid in reinforcing the scope of a concept.

An apparatus in accordance with the subject matter of the present disclosure can include a plurality of counting elements or beads, such as has been shown and described above in connection with FIGS. 1-4. It will be appreciated that counting elements or beads of any suitable type, kind, configuration and/or construction could be used. Additionally, it will be appreciated that counting elements of different sizes, shapes and/or configurations could be used to differentiate some beads from other beads, such as has been described. In a preferred arrangement, however, all of the counting elements of the apparatus can be of a common size, shape and configuration, and can be color differentiated, such as has been described above in connection with columns C1, C2A, C2B, C2C and C2D, for example.

FIGS. 5-8 illustrate one example of a counting element 200 that is suitable for use as counting elements 144, such as have been shown and described above in connection with FIGS. 1-4. Counting element 200 can include an element body 202 that can be formed from any suitable material or combination of materials, such as a polymeric material, for example. In the arrangement shown in FIGS. 5-8, counting element 200 has a longitudinal axis AX (FIG. 8) and element body 202 extends in an endless, annular ring about axis AX.

In a preferred arrangement, counting element 200 and element body 202 thereof are formed as a unitary component and can include any suitable number of one or more walls and/or wall portions. For example, element body 202 extends lengthwise between opposing end surfaces 204 and 206.

Element body 202 includes an outer wall (or outer wall portion) 208 that extends lengthwise between end surfaces 204 and 206. Additionally, outer wall 208 includes an outer surface 210 and an inner surface 212 facing radially inward. An end wall (or end wall portion) 214 extends radially inward from along outer wall 208 and at least partially defines end surface 204 and an inner surface portion 216 facing opposite end surface 204. A plurality of inner walls (or inner wall portions) 218 extend axially from along end wall 210 in a direction toward end surface 206. Two or more of the inner walls can be disposed in circumferentially-spaced relation to one another about axis AX. In a preferred arrangement, at least three inner walls are included on or along element body 202 with axially-extending slots 218A extending between adjacent ones of the inner walls. Additionally, inner walls 218 include an outer surface 220 and an inner surface 222 that at least partially defines a passage 224 extending through counting element 200. Inner walls 218 extend axially from along end wall 214 to a free end 226 that is disposed in spaced relation from end surface 204 and toward end surface 206.

End surfaces 204 and 206 are dimensioned such that adjacent counting elements can abuttingly engage one another along the respective end surfaces thereof. Surfaces 212, 216 and 220 at least partially define a recess 228 that extends axially into element body 202 from along end surface 206. Passage 224 is dimensioned to receivingly engage the outer surface of elongated rods 142. In a preferred arrangement, recess 228 permits free ends 226 of inner walls 218 to deflect outwardly and function as biasing elements engaging the outer surface of elongated rods 142. In some cases, drag pads 230 or other features can be provided on or along inner surface 222 of inner walls 218 adjacent free ends 226 thereof. Drag pads 230 can be dimensioned to assist in providing a predetermined or otherwise desired amount of frictional resistance to sliding of counting elements 200 on or along the elongated rods. In a preferred arrangement, the frictional resistance to sliding should be at, around or slightly greater than the amount of frictional resistance required for the beads to stay in place, as positioned by the user during use of the associated apparatus. That is, it will be recognized an appreciated that the amount of frictional resistance required will vary as the size, shape, configuration and materials of apparatus components vary. It has been determined that, in some cases, a static drag force or other measure of frictional resistance to sliding movement can be within a range of from approximately 0.02 pounds to approximately 0.25 pounds. More preferably, a static drag force or other measure of frictional resistance to sliding movement can be within a range of from approximately 0.03 pounds to approximately 0.12 pounds. Even more preferably, a static drag force or other measure of frictional resistance to sliding movement within a range of from approximately 0.03 pounds to approximately 0.08 pounds can be used.

Counting element 200 can, optionally, include one or more features that could assist with handling, manipulation and/or movement of the counting elements during use in an assembled condition on or along an elongated rod of an apparatus, such as one of elongated rods 142 of apparatus 100, for example. It will be appreciated that any suitable combination of features and/or elements can be used. As one example, element body 202 can include an outer ridge (or ridge wall portion) 232 that projects outward from along outer wall 208 beyond outer surface 210 toward an outer peripheral surface 234. In a preferred arrangement, outer ridge 232 can have an axial length that is less than the overall axial length of outer wall 208 and/or less than the distance between end surfaces 204 and 206.

Additionally, in some cases, one or more tactile bumps, recesses and/or other features can be formed on or along outer ridge 232 and extend along and/or around the perimeter of the outer ridge. Such features can assist in selection and/or manipulation (e.g., sliding) of the beads. If provided, such features can be engaged by a user's fingertip, which can land within a recess or between adjacent bumps to facilitate sliding, such as by providing a way to apply torque to the bead that can tend to break static friction and ease bead movement. In the exemplary arrangements shown in FIGS. 1-4 and in FIGS. 5-8, outer ridge 232 includes a plurality of recesses 234 that extend into the outer ridge and at least partially form a plurality of projections 236 that are disposed between adjacent recesses.

Figure 9:
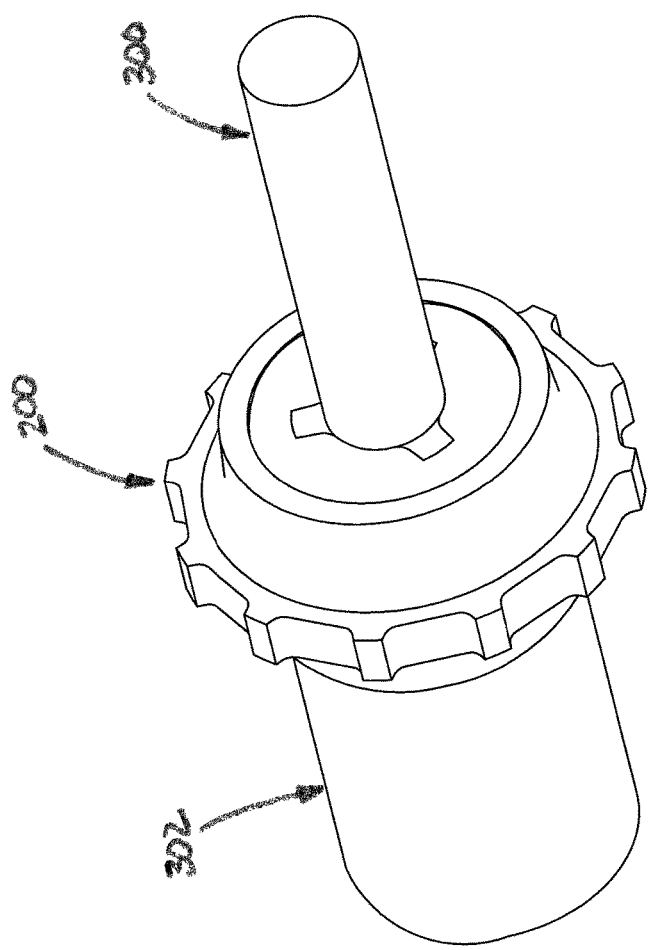
FIG. 9 is a perspective view of a core pin and a boss pin in an assembled condition with a counting element in accordance with the subject matter of the present disclosure molded thereon.
Figure 10:
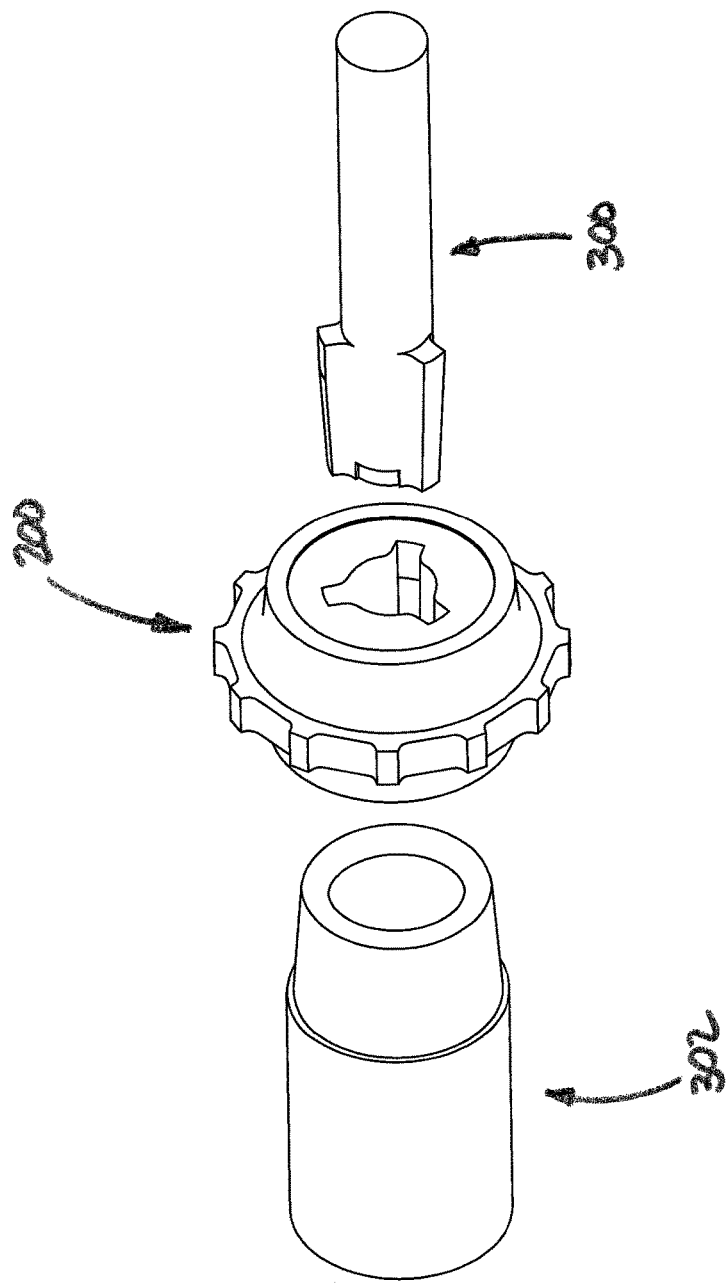
FIG. 10 is a perspective view of the core pin, boss pin and counting element in a disassembled condition.

It will be appreciated that a counting element in accordance with the subject matter of the present disclosure, such as counting elements 144 and/or 200, for example, can be manufactured or otherwise formed in any suitable manner. As one example, the counting elements can be molded from a polymeric material using a conventional injection molding process. In such cases, external features, such as one or more of end surfaces 204 and 206, outer ridge 232, recesses 234 and/or projections 236 can be integrally formed by way of an otherwise conventional mold and mold cavity. Additionally, it may be desirable to integrally form certain internal features of the counting elements, such as one or more of inner walls 218, passage 224 and/or drag pads 230 for example. In such cases, a core pin 300 can be used that includes one or more inverse features, such as shown in FIGS. 9 and 10. And, a mating boss pin 302 can include certain other inverse features such that the resulting component includes the desired overall construction.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse" and the like are to be broadly interpreted. As such, the terms "transverse" and the like can include a wide range of relative angular orientations that include, but are not limited to, an approximately perpendicular angular orientation. Also, the terms "circumferential," "circumferentially," and the like are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid, gel, non-solid or otherwise flowable material (e.g., a melted metal, melted plastic or combination of melted materials) is deposited or otherwise presented between adjacent component parts and operative to form a fixed connection therebetween. Examples of processes that can be used to form such a flowed-material joint include, without limitation, welding processes, brazing processes and soldering processes. In such cases, one or more polymeric or other materials, compounds and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An educational apparatus for teaching math, said educational apparatus comprising:

a frame having a frame opening;

an elongated rod including an outer surface, said elongated rod operatively connected to said frame and extending across said frame opening; and, a plurality of counting elements disposed along said elongated rod, each of said plurality of counting elements including an element body forming an annular ring extending peripherally about said elongated rod and lengthwise between a first end surface and a second end surface opposite said first end surface, each said element body including:

an outer wall portion extending lengthwise between said first and second end surfaces, said outer wall portion including an outer surface facing radially outward and an inner surface facing radially inward toward said elongated rod; and, a plurality of inner wall portions operatively connected to said outer wall portion adjacent said first end surface and extending axially to a free end disposed toward said second end surface such that an annular recess is at least partially defined between said inner surface of said outer wall portion and said plurality of inner wall portions with said plurality of inner wall portions defining a passage through said element body dimensioned to receive said elongated rod and function as biasing elements operative to generate frictional resistance to sliding movement of said element body along said elongated rod.

2. An educational apparatus according to claim 1, wherein said frame includes a base wall portion, a first side wall portion oriented transverse to said base wall portion and projecting outwardly therefrom in a first direction, and a second side wall portion oriented transverse to said base wall portion and projecting outwardly therefrom in said first direction, said second side wall portion positioned in offset relation to said first side wall portion such that said first and second side wall portions are co-extensive with one another and such that said frame opening is at least partially defined between said first and second side wall portions.

3. An educational apparatus according to claim 2, wherein said frame includes:
    a base wall having a base wall length extending lengthwise between a first edge and a second edge such that said base wall portion is formed therebetween;
    a first side wall secured to said base wall along said first edge thereof, said first side wall extending from said base wall toward a first distal edge such that said first side wall portion is formed therebetween; and,
    a second side wall secured to said base wall along said second edge thereof, said second side wall extending from said base wall toward a second distal edge such that said second side wall portion is formed therebetween with said first and second distal edges offset approximately equidistant to one another from said base wall.

4. An educational apparatus according to claim 3, wherein said first and second side walls are operatively connected to said base wall by at least one of a plurality of securement devices and a flowed-material joint.

5. An educational apparatus according to claim 2 further comprising a first indicia in the form of a plus (+) symbol disposed along said first side wall portion representative of a mathematically additive direction and a second indicia in the form of a minus (−) symbol disposed along said second side wall portion representative of a mathematically subtractive direction.

6. An educational apparatus according to claim 1, wherein said elongated rod is one of a plurality of elongated rods each having an outer surface and being operatively connected to said frame, said plurality of elongated rods disposed in offset relation to one another and oriented such that said plurality of elongated rods extend across said frame opening in approximate alignment with one another.

7. An educational apparatus according to claim 6, wherein said plurality of elongated rods include three to five elongated rods.

8. An educational apparatus according to claim 6 further comprising a first indicia in the form of a dot (•) symbol disposed along said frame between adjacent ones of said plurality of elongated rods representative of a mathematical decimal separator parsing said plurality of rows into two different groups of rows.

9. An educational apparatus according to claim 6 further comprising a plurality of indicia commonly selected from the group consisting of numbers, alphanumeric characters, symbols, geometric shapes, images and graphics with each of said plurality of indicia disposed adjacent a different one of said plurality of elongated rods such that each of said plurality of elongated rods can be assigned to a different educational lesson or mathematical problem.

10. An educational apparatus according to claim 6, wherein said plurality of counting elements include a plurality of counting elements disposed along each of said plurality of elongated rods.

11. An educational apparatus according to claim 10, wherein each of said plurality of elongated rods includes ten counting elements with two of said ten counting elements having a first color and eight of said ten counting elements having a second color that is different from said first color, said first color of being common to said two of said ten counting elements on each of said plurality of elongated rods, and said second color of said eight of said ten counting elements being different for each of said plurality of elongated rods.

12. An educational apparatus according to claim 1, wherein said plurality of counting elements includes ten counting elements with two of said ten counting elements having a first color and eight of said ten counting elements having a second color that is different from said first color with said ten counting elements arranged on said elongated rod in an order of 4-1-4-1 corresponding to four counting elements having said second color, one counting element having said first color, four counting elements having said second color and one counting element having said first color.

13. An educational apparatus according to claim 1, wherein said plurality of inner wall portions are disposed radially inward of said outer wall portion, and said annular recess permits said free end of said inner wall portions to be radially deflectable to function as said biasing elements operative to generate frictional resistance to sliding movement of said element body along said outside surface of said elongated rod.

14. An educational apparatus according to claim 13, wherein said element body includes a ridge wall portion extending radially outward beyond said outer surface of said outer wall portion, said ridge wall portion including a plurality of recesses extending radially inward into said ridge wall portion such that a plurality of projections are formed along said ridge wall portion, said plurality of projections disposed in peripherally spaced relation to one another such that one of said plurality of recesses is disposed between adjacent ones of said plurality of projections providing a tactile feature to said counting element.

15. An educational apparatus according to claim 1, wherein said plurality of inner wall portions is dimensioned to generate frictional resistance to sliding movement having a static drag force within a range of from approximately 0.02 pounds to approximately 0.25 pounds.

16. An educational apparatus according to claim 15, wherein said plurality of inner wall portions is dimensioned to generate frictional resistance to sliding movement having a static drag force within a range of from approximately 0.03 pounds to approximately 0.12 pounds.

17. An educational apparatus according to claim 1, wherein each of said plurality of inner wall portions includes a drag pad disposed along said free end and oriented in facing relation to said passage, said drag pads dimensioned to abuttingly engage said outside surface of said elongated rod.

18. A method of assembling an educational apparatus for teaching math, said method comprising:
    providing a frame having a frame opening;
    providing an elongated rod having an outside surface;
    providing a plurality of counting elements that each include an element body having a longitudinal axis, each said element body extending between a first end surface and a second end surface spaced axially from said first end surface, each said element body including an element wall that extends peripherally about said longitudinal axis between said first and second end surfaces, and each said element body including:

an outer wall portion extending between said first and second end surfaces, said outer wall portion including an outer surface facing radially outward and an inner surface facing radially inward; and, a plurality of inner wall portions disposed radially inward of said outer wall portion, said plurality of inner wall portions operatively connected to said outer wall portion adjacent said first end surface and extending axially to a free end disposed toward said second end surface such that an annular recess is at least partially defined between said inner surface of said outer wall portion and said plurality of inner wall portions, said plurality of inner wall portions defining a passage through said element body dimensioned to receive said elongated rod; and, positioning said plurality of counting elements on said elongated rod such that said annular recess permits said free end of said inner wall portions of said element body of each of said plurality of counting elements to be radially deflectable and function as biasing elements operative to generate frictional resistance to sliding movement of said element body along said outside surface of said elongated rod; and, installing said elongated rod together with said counting elements on said frame across said frame opening.

19. A method according to claim 18, wherein:

providing said plurality of counting elements includes providing ten counting elements with two of said ten counting elements having a first color and eight of said ten counting elements having a second color that is different from said first color; and, positioning said plurality of counting elements on said elongated rod includes arranging said ten counting elements on said elongated rod in an order of 4-1-4-1 corresponding to four counting elements having said second color, one counting element having said first color, four counting elements having said second color and one counting element having said first color.

20. A method according to claim 19, wherein:

providing said elongated rod includes providing a plurality of elongated rods;

providing said plurality of counting elements includes providing ten counting elements for each of said plurality of elongated rods with two of said ten counting elements having a first color and eight of said ten counting elements having a second color that is different from said first color;

positioning said plurality of counting elements on said elongated rod includes positioning said ten counting elements on each of said plurality of elongated rods with said first color of being common to said two of said ten counting elements on each of said plurality of elongated rods, and said second color of said eight of said ten counting elements being different for each of said plurality of elongated rods; and, installing said elongated rod includes installing said plurality of elongated rods together with said ten counting elements thereof on said frame in offset relation to one another and oriented such that said plurality of elongated rods extend across said frame opening in approximate alignment with one another.

* * * * *